United States Patent
Hwang

(10) Patent No.: US 9,858,842 B2
(45) Date of Patent: Jan. 2, 2018

(54) DISPLAY DEVICE GATE VOLTAGE GENERATOR OUTPUTTING A COMPENSATION VOLTAGE

(71) Applicant: Samsung Display Co. Ltd., Yongin, Gyeonggi-Do (KR)

(72) Inventor: Jun Ho Hwang, Asan-si (KR)

(73) Assignee: Samsung Display Co., Ltd. (KR)

( * ) Notice: Subject to any disclaimer, the term of this patent is extended or adjusted under 35 U.S.C. 154(b) by 257 days.

(21) Appl. No.: 14/612,139

(22) Filed: Feb. 2, 2015

(65) Prior Publication Data

US 2016/0104406 A1    Apr. 14, 2016

(30) Foreign Application Priority Data

Oct. 13, 2014 (KR) .......................... 10-2014-0137766

(51) Int. Cl.
| | |
|---|---|
| *G09G 3/20* | (2006.01) |
| *G09G 3/36* | (2006.01) |
| *H02M 3/07* | (2006.01) |
| *H02M 3/156* | (2006.01) |
| *H02M 1/00* | (2006.01) |

(52) U.S. Cl.
CPC .............. *G09G 3/20* (2013.01); *G09G 3/3696* (2013.01); *G09G 3/3677* (2013.01); *G09G 2300/0417* (2013.01); *G09G 2320/041* (2013.01); *G09G 2330/021* (2013.01); *H02M 3/07* (2013.01); *H02M 3/156* (2013.01); *H02M 2001/007* (2013.01)

(58) Field of Classification Search
None
See application file for complete search history.

(56) References Cited

U.S. PATENT DOCUMENTS

| | | | | |
|---|---|---|---|---|
| 9,098,103 | B1* | 8/2015 | Milanesi | G05F 1/46 |
| 2007/0024560 | A1* | 2/2007 | Kim | G09G 3/3614 |
| | | | | 345/94 |
| 2007/0035501 | A1* | 2/2007 | Moh | G09G 3/3696 |
| | | | | 345/98 |
| 2007/0109888 | A1* | 5/2007 | Baker | G11C 29/38 |
| | | | | 365/201 |

(Continued)

FOREIGN PATENT DOCUMENTS

| | | |
|---|---|---|
| KR | 10-2010-0026317 | 3/2010 |
| KR | 10-2011-0038496 | 4/2011 |

(Continued)

*Primary Examiner* — Nathan Brittingham
(74) *Attorney, Agent, or Firm* — Innovation Counsel LLP

(57) ABSTRACT

A display device is provided. A display device comprising, a gate voltage generator outputting a gate-on voltage and a gate-off voltage, a clock generator receiving the gate-on voltage and the gate-off voltage and outputting a clock signal, a gate driver receiving the clock signal and outputting a gate signal, the gate driver including a plurality of stages which are connected to a plurality of gate lines respectively, and a pixel unit comprising a plurality of pixels which are turned on or turned off by the gate signal to display an image, wherein the gate voltage generator comprises, a direct current (DC) converter connected to a sub-gate node and receiving a sub-gate signal which is one of outputs of the plurality of stages gate driver and outputting a compensation voltage using the received sub-gate signal.

11 Claims, 13 Drawing Sheets

(56) References Cited

U.S. PATENT DOCUMENTS

| | | | | |
|---|---|---|---|---|
| 2008/0054987 | A1* | 3/2008 | Choi | G09G 3/3696 327/512 |
| 2008/0136756 | A1* | 6/2008 | Yeo | G09G 3/3677 345/87 |
| 2009/0021662 | A1* | 1/2009 | Chang | G02F 1/1368 349/46 |
| 2009/0102779 | A1* | 4/2009 | Jo | G09G 3/3696 345/101 |
| 2009/0122213 | A1* | 5/2009 | Ko | G09G 3/3677 349/46 |
| 2010/0156869 | A1* | 6/2010 | Lee | G09G 3/3677 345/208 |
| 2010/0207927 | A1* | 8/2010 | Joo | G09G 3/3677 345/213 |
| 2011/0102401 | A1* | 5/2011 | Feng | G09G 3/3655 345/211 |
| 2012/0169744 | A1* | 7/2012 | Seo | G09G 3/3696 345/519 |
| 2013/0027287 | A1* | 1/2013 | Lee | G09G 3/3674 345/94 |
| 2013/0314392 | A1* | 11/2013 | Kim | G09G 3/20 345/212 |
| 2014/0145693 | A1* | 5/2014 | Lee | H02M 1/00 323/271 |
| 2014/0184481 | A1* | 7/2014 | Kim | G09G 3/3233 345/82 |
| 2014/0340381 | A1* | 11/2014 | Kim | G09G 3/3655 345/212 |
| 2014/0347341 | A1* | 11/2014 | Pyun | G09G 3/3696 345/212 |
| 2015/0026506 | A1* | 1/2015 | Lee | G06F 11/0706 714/3 |
| 2016/0365051 | A1* | 12/2016 | Jung | G09G 3/3406 |

FOREIGN PATENT DOCUMENTS

| | | |
|---|---|---|
| KR | 10-2011-0091369 | 8/2011 |
| KR | 10-2011-0096424 | 8/2011 |
| KR | 10-2015-0009208 | 1/2015 |

\* cited by examiner

DISPLAY DEVICE GATE VOLTAGE GENERATOR OUTPUTTING A COMPENSATION VOLTAGE

This application claims priority from Korean Patent Application No. 10-2014-0137766 filed on Oct. 13, 2014 in the Korean Intellectual Property Office, the disclosure of which is incorporated herein by reference in its entirety.

BACKGROUND

1. Field

The present inventive concept relates to a display device and a method of driving the same.

2. Description of the Related Art

Flat panel displays such as liquid crystal displays (LCDs) and organic light-emitting diode displays (OLEDs) are being actively developed to replace heavy and large cathode ray tubes (CRTs).

An LCD applies an electric field to a liquid crystal layer interposed between two electrodes which are disposed on display substrates and adjusts the transmittance of light passing through the liquid crystal layer by controlling the intensity of the electric field. Thus, the LCD display displays a desired image. An OLED displays characters or an image using the electroluminescence of particular organic material or polymer.

Of the flat panel displays, an LCD and an OLED each include a pixel unit which includes a plurality of pixels, each having a switch element, and a driving unit which includes various circuits and integrated circuits (ICs) for generating signals needed to drive the pixel unit.

An output voltage of the driving unit varies according to a change in temperature. Thus, the output voltage has to be compensated according to the temperature. In addition, since a low temperature leads to a low driving voltage, the display device may not be driven as intended at the low temperature (see FIG. 11).

A module for adjusting the output voltage of the driving unit to compensate for the temperature change of the driving unit according to the conventional method has a temperature compensation circuit on a printed circuit board (PCB) 800. The temperature compensation circuit in the PCB 800 cannot reflect the temperature change on the LCD panel which is influence by the temperature change. Therefore, the module may be unable to reflect temperature changes in the LCD panel. As a result, the output voltage of the driving unit may be adjusted inaccurately (see FIGS. 12 and 13).

SUMMARY

Aspects of the present inventive concept provide a display device including a driving unit which can output a signal at a constant voltage level despite a temperature change of the display device.

Aspects of the present inventive concept also provide a method of driving a display device including a driving unit which can output a signal at a constant voltage level despite a temperature change of the display device.

However, aspects of the present inventive concept are not restricted to the one set forth herein. The above and other aspects of the present inventive concept will become more apparent to one of ordinary skill in the art to which the present inventive concept pertains by referencing the detailed description of the present inventive concept given below.

According to an aspect of the present inventive concept, there is provided a display device including a gate voltage generator outputting a gate-on voltage and a gate-off voltage, a clock generator receiving the gate-on voltage and the gate-off voltage and outputting a clock signal, a gate driver receiving the clock signal and outputting a gate signal, the gate driver including a plurality of stages which are connected to a plurality of gate lines respectively, and a pixel unit comprising a plurality of pixels which are turned on or turned off by the gate signal to display an image. The gate voltage generator includes a direct current (DC) converter connected to a sub-gate node and receiving a sub-gate signal which is one of outputs of the plurality of stages and outputting a compensation voltage using the received sub-gate signal.

The gate voltage generator may further include a charge pump connected to the DC converter and generating a gate on voltage and a gate off voltage using the compensation voltage.

The DC converter may include a detection unit connected to the sub-gate node and measuring a difference between an on-level voltage and an off-level voltage of the received sub-gate signal, a comparison unit connected to the detection unit and comparing a preset reference voltage with the difference between the on-level voltage and the off-level voltage of the sub-gate signal, a switch unit connected between the comparison unit and an output node, the switch unit including a switch and a switch controller which controls the switch using a comparison result of the comparison unit, and an inductor connected between an input node and the output node.

If the difference between the on-level voltage and the off-level voltage of the sub-gate signal is smaller than the preset reference voltage, the DC converter may output the compensation voltage that causes an on-level voltage of the sub-gate signal having a greater value than the on-level voltage of a previous sub-gate signal.

If the difference between the on-level voltage and the off-level voltage of the sub-gate signal is smaller than the preset reference voltage, the DC converter may output the compensation voltage that causes an off level voltage of the sub-gate signal having a smaller value than the off-level voltage of a previous sub-gate signal.

If the difference between the on-level voltage and the off-level voltage of the sub-gate signal is greater than the preset reference voltage, the DC converter may output the compensation voltage that causes an on-level voltage of the sub-gate signal having a smaller value than the on-level voltage of a previous sub-gate signal.

If the difference between the on-level voltage and the off-level voltage of the sub-gate signal is greater than the preset reference voltage, the DC converter may output the compensation voltage that causes an off-level voltage of the sub-gate signal having a greater value than the off level voltage of a previous sub-gate signal.

The a plurality of stages may sequentially output the gate signal, each of the stages including at least one amorphous silicon thin-film transistor, and the gate driver further comprises a dummy stage which outputs the sub-gate signal that is provided to the gate voltage generator.

The sub-gate signal may be provided from the last stage.

The switch unit may accumulate a plurality of comparison results received from the comparison unit and controls the operation of the switch using the accumulated comparison results.

The DC converter may further include a slope compensation unit.

The DC converter may output a plurality of compensation voltages.

According to another aspect of the present inventive concept, there is provided a method of driving a display device, the method includes providing a sub-gate signal, which is one of outputs of a gate driver, to a DC converter, generating a compensation voltage using the sub-gate signal, generating a gate-on voltage and a gate-off voltage using the compensation voltage, generating a clock signal using the gate-on voltage and the gate-off voltage, and generating a modified gate signal using the clock signal.

The generating the compensation voltage may include measuring a difference between an on-level voltage and an off-level voltage of the sub-gate signal, comparing a preset reference voltage with the difference between the on-level voltage and the off-level voltage of the sub-gate signal, and controlling a switch to reduce a difference between the gate-on/off voltage difference and the reference voltage.

BRIEF DESCRIPTION OF THE DRAWINGS

The above and other aspects and features of the present inventive concept will become more apparent by describing in detail exemplary embodiments thereof with reference to the attached drawings, in which.

DETAILED DESCRIPTION

Figure 1:
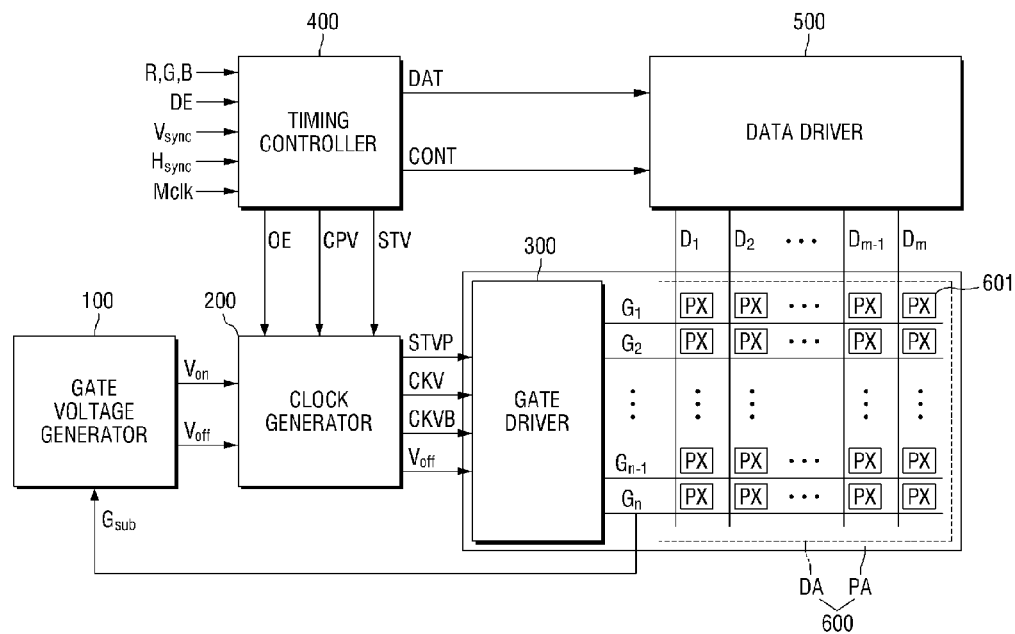
FIG. 1 is a block diagram of a liquid crystal display (LCD) according to an embodiment of the present inventive concept.

Advantages and features of the present inventive concept and methods of accomplishing the same may be understood more readily by reference to the following detailed description of preferred embodiments and the accompanying drawings. The present inventive concept may, however, be embodied in many different forms and should not be construed as being limited to the embodiments set forth herein. Rather, these embodiments are provided so that this disclosure will be thorough and complete and will fully convey the concept of the inventive concept to those skilled in the art, and the present inventive concept will only be defined by the appended claims. Like reference numerals refer to like elements throughout the specification.

A display device according to an embodiment of the present inventive concept will now be described in detail with reference to FIGS. 1 and 2. While a liquid crystal display (LCD) will be described as an example, the display device according to the embodiment of the present inventive concept is not limited to the LCD. The present inventive concept can also be applied to other types of display devices such as an organic light-emitting diode display (OLED).

FIG. 1 is a block diagram of an LCD according to an embodiment of the present inventive concept.

Referring to FIG. 1, the LCD according to the current embodiment includes a gate voltage generator 100, a clock generator 200, a gate driver 300, a timing controller 400, a data driver 500, and a liquid crystal panel 600.

The liquid crystal panel 600 may include a display area DA where images are displayed and a non-display area PA where no images are displayed.

The display area DA includes a plurality of gate lines $G_1$ through $G_n$, a plurality of data lines $D_1$ through $D_m$, and a plurality of pixels 601. The gate lines $G_1$ through $G_n$ may extend in a substantially row direction to be parallel to each other, and the data lines $D_1$ through $D_m$ may extend in a substantially column direction to be parallel to each other. The pixels 601 will be described later with reference to FIG. 2.

The non-display area PA is where no images are displayed. A first substrate 720 may be formed wider than a second substrate 730, and the non-display area PA may be provided in a portion of the first substrate 720 which does not overlap the second substrate 730. The gate driver 300 may be directly formed on the first substrate in the non-display area PA or mounted on the first substrate in the non-display area PA as an IC chip.

The gate voltage generator 100 may generate a gate-on voltage $V_{on}$ and a gate-off voltage $V_{off}$ and provide the gate-on voltage $V_{on}$ and the gate-off voltage $V_{off}$ to the clock generator 200. In addition, the gate voltage generator 100 may receive a sub-gate signal $G_{sub}$ from the gate driver 300. The gate voltage generator 100 will be described in detail later with reference to FIGS. 3 through 5.

The timing controller 400 may receive input image signals R, G and B from an external graphics controller (not shown) and input control signals for controlling the display of the input image signals R, G and B. Examples of the input control signals include a vertical synchronization signal Vsync, a horizontal synchronization signal Hsync, a main clock signal Mclk, and a data enable signal DE.

The timing controller 400 generates a data control signal CONT based on the input image signals R, G and B and the input control signals, and sends the data control signal CONT and an image data signal DAT to the data driver 500.

The timing controller 400 provides a first clock generation control signal OE, a second clock generation control signal CPV, and an original scan start signal STV to the clock generator 200. Here, the first clock generation control signal OE may enable gate signals $G_{out(1)}$ through $G_{out(n)}$, and the second clock generation control signal CPV may determine a duty ratio of each of the gate signals $G_{out(1)}$ through $G_{out(n)}$. The original scan start signal STV may indicate the start of a frame.

In response to the first clock generation control signal OE, the second clock generation control signal CPV, and the original scan start signal STV, the clock generator 200 outputs a clock signal CKV, a clock bar signal CKVB, the gate-off voltage $V_{off}$ and scan start signal STVP to the gate driver 300. Here, the clock signal CKV and the clock bar signal CKVB may swing between the gate-on voltage $V_{on}$ and the gate-off voltage $V_{off}$ and may have different phases.

The clock generator 200 converts the original scan start signal STV into a scan start signal STVP and provides the scan start signal STVP to the gate driver 300. The scan start signal STVP is obtained by increasing the amplitude of the original scan start signal STV.

The gate driver 300 is enabled by the scan start signal STVP to generate a plurality of gate signals $G_{out(1)}$ through $G_{out(n)}$ using the clock signal CKV, the clock bar signal CKVB and the gate-off voltage $V_{off}$, and sequentially transmit the gate signals $G_{out(1)}$ through $G_{out(n)}$ to the gate lines $G_1$ through $G_n$, respectively.

The data driver 500 receives the image data signal DAT and the data control signal CONT from the timing controller 400 and provides an image data voltage corresponding to the image data signal DAT to each of the data lines $D_1$ through $D_m$. The data control signal CONT is used to control the operation of the data driver 500 and includes a horizontal start signal (not shown) for starting the operation of the data driver 500 and a load signal (not shown) for instructing the output of two data voltages.

The data driver 500 may be mounted, as an integrated circuit (IC), on the liquid crystal panel 600 in the form of a tape carrier package (TCP). However, the present inventive concept is not limited thereto, and the data driver 500 may also be directly formed on the non-display region PA of the liquid crystal panel 600.

A further detailed description of the gate driver 300 will be given later with reference to FIGS. 9 and 10.

Figure 2:
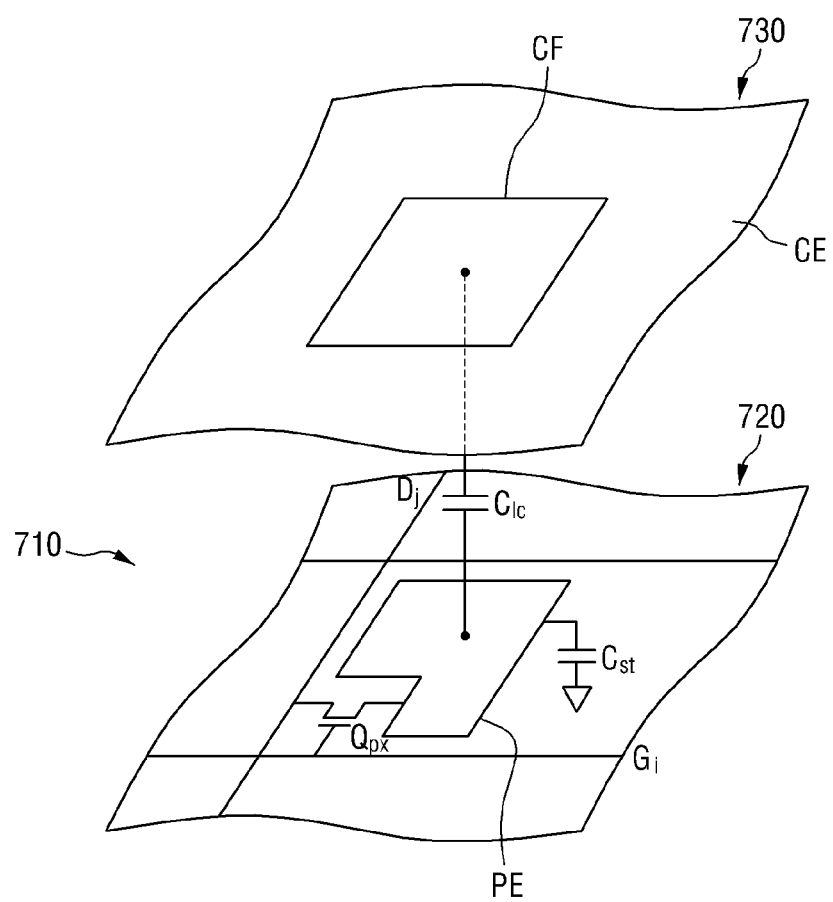
FIG. 2 is an equivalent circuit diagram of one pixel of the LCD of FIG. 1.

FIG. 2 is an equivalent circuit diagram of one pixel 601 of the LCD of FIG. 1.

Referring to FIG. 2, one pixel 601 of FIG. 1 includes the first substrate 720 having a switch element $Q_{px}$ and a pixel electrode PE, the second substrate 730 having a color filter CF and a common electrode CE, and liquid crystal molecules 710 interposed between the first substrate 720 and the second substrate 730. The color filter CF may be formed in a portion of the common electrode CE of the second substrate 730 to face the pixel electrode PE of the first substrate 720.

In addition, a pixel 601 connected to an $i^{th}$ (i=one of 1 to n) gate line $G_i$ and a $j^{th}$ (j=one of 1 to m) data line $D_j$ may include the switch element $Q_{px}$, which is connected to the $i^{th}$ gate line $G_i$ and the $j^{th}$ data line $D_j$, and a liquid crystal capacitor $C_{lc}$ and a storage capacitor $C_{st}$ which are connected to the switch element $Q_{px}$. The storage capacitor $C_{st}$ can be omitted if necessary. The switch element $Q_{px}$ may be a thin-film transistor made of amorphous silicon as an active layer.

Figure 3:
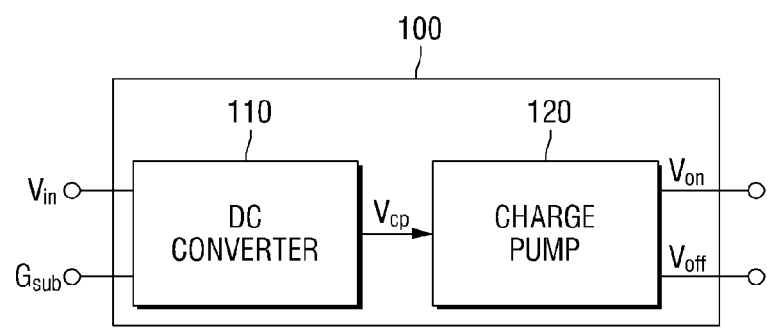
FIG. 3 is a block diagram of a gate voltage generator according to an embodiment of the present inventive concept.

FIG. 3 is a block diagram of a gate voltage generator 100 according to an embodiment of the present inventive concept.

Referring to FIG. 3, the gate voltage generator 100 may include a direct current (DC) converter 110 and a charge pump 120.

The DC converter 110 receives an input voltage $V_{in}$ and a sub-gate signal $G_{sub}$ and provides a compensation voltage $V_{cp}$ to the charge pump 120. In addition, the DC converter 110 may adjust the compensation voltage $V_{cp}$ according to a change in temperature inside or outside the display device.

An example of the DC converter 110 may be a DC-DC converter, and other types of converters can also be employed.

The charge pump 120 receives the compensation voltage $V_{cp}$ from the DC converter 110 and outputs a gate-on voltage $V_{on}$ and a gate-off voltage $V_{off}$ using the compensation voltage $V_{cp}$. Some circuits used in the display device may require a higher voltage than a power supply voltage due to their operation characteristics. Therefore, the charge pump 120 may be used to stably step up the power supply voltage to a higher voltage.

Figure 4:
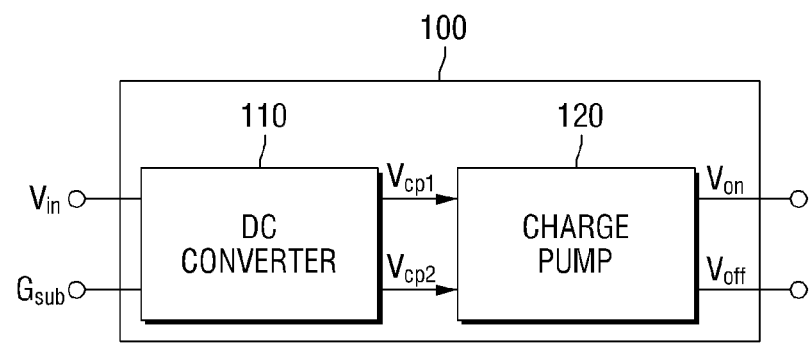
FIG. 4 is a block diagram of a gate voltage generator according to another embodiment of the present inventive concept.

FIG. 4 is a block diagram of a gate voltage generator 100 according to another embodiment of the present inventive concept.

Referring to FIG. 4, a DC converter 110 of the gate voltage generator 100 according to the current embodiment may output a first compensation voltage $V_{cp1}$ and a second compensation voltage $V_{cp2}$. However, the present inventive concept is not limited thereto, and the DC converter 110 may also output a greater number of compensation voltages. Since other components of the gate voltage generator 100 have already been described above with reference to FIG. 3, a description thereof will be omitted.

Figure 5:
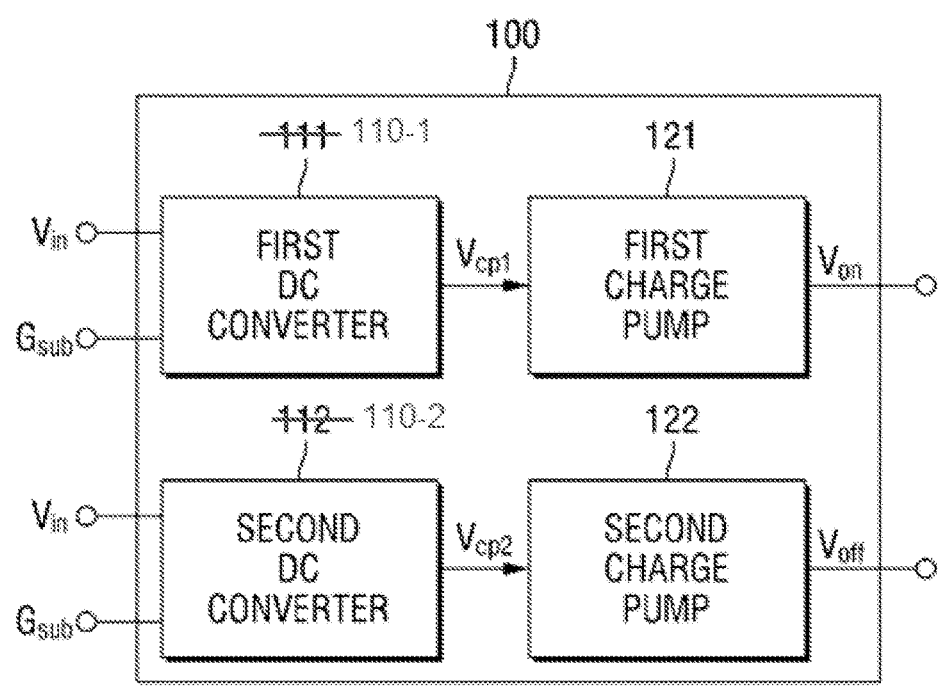
FIG. 5 is a block diagram of a gate voltage generator according to another embodiment of the present inventive concept.

FIG. 5 is a block diagram of a gate voltage generator 100 according to another embodiment of the present inventive concept.

Referring to FIG. 5, the gate voltage generator 100 according to the current embodiment may include a first DC converter 110-1, a second DC converter 110-2, a first charge pump 121, and a second charge pump 122. The first DC converter 110-1 may receive an input voltage $V_{in}$ and a sub-gate signal $G_{sub}$ and output a first compensation voltage $V_{cp1}$. The first compensation voltage $V_{cp1}$ may be provided to the first charge pump 121. The first charge pump 121 may receive the first compensation voltage $V_{cp1}$ and output a gate-on voltage $V_{on}$. The second DC converter 110-2 may receive an input voltage $V_{in}$ and a sub-gate signal $G_{sub}$ and output a second compensation voltage $V_{cp2}$. The second compensation voltage $V_{cp2}$ may be provided to the second charge pump 122. The second charge pump 122 may receive the second compensation voltage $V_{cp2}$ and output a gate-off voltage $V_{off}$.

However, the present inventive concept is not limited thereto, and more DC converters and more charge pumps can be included. In the current embodiment, the first and second charge pumps 121 and 122 are included in the gate voltage generator 100, together with the first and second DC converters 110-1 and 110-2. However, the present inventive concept is not limited thereto, and the first and second charge pumps 121 and 122 may also form a separate module, and the module may be formed or mounted within the display device. Since other components have been described above with reference to FIG. 3, a description thereof will be omitted.

Figure 6:
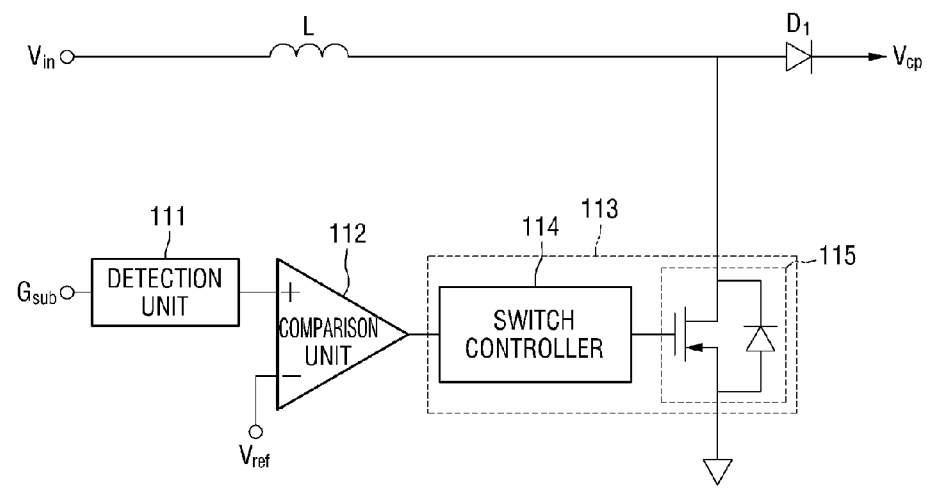
FIG. 6 is a circuit diagram of a direct current (DC) converter according to an embodiment of the present inventive concept.

FIG. 6 is a circuit diagram of a DC converter 110 according to an embodiment of the present inventive concept.

Referring to FIG. 6, the DC converter 110 receives an input voltage $V_{in}$ and a sub-gate signal $G_{sub}$ and outputs a compensation voltage $V_{cp}$ using the input voltage $V_{in}$ and the sub-gate signal $G_{sub}$. Here, the input voltage $V_{in}$ is a voltage applied to drive the voltage generator. The input voltage $V_{in}$ may be received from an external power source (not shown). The sub-gate signal $G_{sub}$ may be one of the gate signals $G_{out(1)}$ through $G_{out(n)}$ output from the gate driver 300. This will be described in greater detail later with reference to FIGS. 9 and 10.

The DC converter 110 may include a detection unit 111, a comparison unit 112, and a switch unit 113.

The detection unit 111 may detect a difference between an on-level voltage and an off-level voltage (hereinafter, referred to as a 'gate-on/off voltage difference') of the sub-gate signal $G_{sub}$, and provide the detected gate-on/off voltage difference to the comparison unit 112.

The comparison unit 112 may compare the gate-on/off voltage difference with a reference voltage $V_{ref}$ and output a difference between the gate-on/off voltage difference and the reference voltage $V_{ref}$. The comparison unit 112 may include a non-inverting input terminal (+) and an inverting input terminal (−). The gate-on/off voltage difference may be input to the non-inverting input terminal (+), and the reference voltage $V_{ref}$ may be input to the inverting input terminal (−). The difference output from the comparison unit 112 may be provided to the switch unit 113.

The switch unit 113 may receive the difference from the comparison unit 112 and switch the circuit such that the compensation voltage $V_{cp}$ can be generated. The switch unit 113 may include a switch controller 114 and a switch 115. The switch controller 114 may receive the difference from the comparison unit 112 and control the operation of the switch 115 based on the difference. Controlling the operation of the switch 115 will be described later with reference to FIG. 7.

The switch controller 114 is connected to a control terminal of the switch 115, thereby controlling the operation of the switch 115. Another terminal of the switch 115 is connected to a node connecting an inductor L and a diode $D_1$, and the other terminal of the switch 115 is connected to a ground. A reverse diode is connected between the node connecting the inductor L and the diode D1, and the ground. The ground may also be a node to which a predetermined voltage is applied.

In the current embodiment, the switch 115 is a metal oxide semiconductor field effect transistor (MOSFET) and the control terminal is a gate of the MOSFET. However, the present inventive concept is not limited thereto, and other electronic elements capable of functioning as the switch 115 can also be used.

The DC converter 110 may generate the compensation voltage $V_{cp}$ as follows. When the MOSFET of the switch unit 113 is on, an electric current may flow from a node to which the input voltage $V_{in}$ is applied to the ground node via the inductor L. During the electric current flow through the inductor L, energy is stored temporarily in a magnetic field in the inductor L. Here, if the switch 115 of the switch unit 113 is turned off, the current flows through the inductor L is changed, thus, a time-varying magnetic field induces a high voltage in the inductor L, thereby output voltage of the DC converter is changed to the compensation voltage $V_{cp}$. By repeating the above process, the desired compensation voltage $V_{cp}$ can be obtained. A value of the output compensation voltage $V_{cp}$ may be adjusted according to the on/off cycle of the switch 115.

Figure 7:
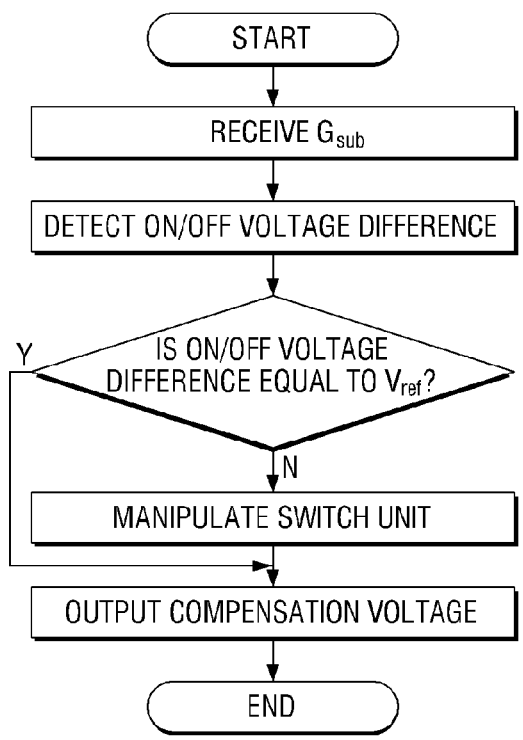
FIG. 7 is a flowchart illustrating a method by which the DC converter outputs a compensation voltage according to an embodiment of the present inventive concept.

FIG. 7 is a flowchart illustrating a method by which the DC converter 110 of outputs the compensation voltage $V_{cp}$ according to an embodiment of the present inventive concept. Referring to FIG. 7, the DC converter 110 may receive a sub-gate signal $G_{sub}$ and measure a gate-on/off voltage difference of the received sub-gate signal $G_{sub}$. The measured gate-on/off voltage difference of the sub-gate signal $G_{sub}$ may be compared with a reference voltage $V_{ref}$. Here, the reference voltage $V_{ref}$ may be equal to a value of a gate signal that can be output from the gate driver 300 in an ideal condition unaffected by a change in temperature inside or outside the display device.

If a comparison result of the comparison unit 112 indicates that a difference between the gate-on/off voltage difference and the reference voltage $V_{ref}$ is zero, a value of the compensation voltage $V_{cp}$ may be output as it is without additional manipulation of the switch controller 114. If the comparison result of the comparison unit 112 indicates that the difference between the gate-on/off voltage difference and the reference voltage $V_{ref}$ is not zero, the on/off cycle of the switch 115 may be changed by manipulating the switch controller 114 in order to reduce a difference between the gate-on/off voltage difference and the reference voltage by change the value of the compensation voltage $V_{cp}$.

Specifically, if the comparison result of the comparison unit 112 indicates that the gate-on/off voltage difference of the sub-gate signal $G_{sub}$ is smaller than the reference voltage $V_{ref}$, the switch unit 113 may operate in such a way to cause an on-level voltage of the sub-gate signal $G_{sub}$ having a greater value than an on-level voltage of pre-outputted the sub-gate signal $G_{sub}$ to be generated. In other words, the switch controller 114 may increase the value of the compensation voltage $V_{cp}$ used to generate a gate-on voltage $V_{on}$ by changing the on/off cycle of the switch 115.

If the comparison result of the comparison unit 112 indicates that the gate-on/off voltage difference of the sub-gate signal $G_{sub}$ is smaller than the reference voltage $V_{ref}$, the switch unit 113 may operate in such a way to cause an off-level voltage of the sub-gate signal $G_{sub}$ having a smaller value than an off-level voltage of pre-outputted the sub-gate signal $G_{sub}$ to be generated. In other words, the switch controller 114 may decrease the value of the compensation voltage $V_{cp}$ used to generate a gate-off voltage $V_{off}$ by changing the on/off cycle of the switch 115.

In addition, if the comparison result of the comparison unit 112 indicates that the gate-on/off voltage difference of the sub-gate signal $G_{sub}$ is greater than the reference voltage $V_{ref}$, the switch unit 113 may operate in such a way to cause an on-level voltage of the sub-gate signal $G_{sub}$ having a smaller value than the on-level voltage of pre-outputted the sub-gate signal $G_{sub}$ to be generated. In other words, the switch controller 114 may decrease the value of the compensation voltage $V_{cp}$ used to generate the gate-on voltage $V_{on}$ by changing the on/off cycle of the switch 115.

If the comparison result of the comparison unit 112 indicates that the gate-on/off voltage difference of the sub-gate signal $G_{sub}$ is greater than the reference voltage $V_{ref}$, the switch unit 113 may operate in such a way to cause an off-level voltage of the sub-gate signal $G_{sub}$ having a greater value than the off-level voltage of pre-outputted the sub-gate signal $G_{sub}$ to be generated. In other words, the switch controller 114 may increase the value of the compensation voltage $V_{cp}$ used to generate the gate-off voltage $V_{off}$ by changing the on/off cycle of the switch 115.

In addition, the switch unit 113 may change the compensation voltage $V_{cp}$ by a preset amount or gradually. For example, the preset amount by which the compensation voltage $V_{cp}$ is changed may be 0.1 V. In this case, if the comparison result of the comparison unit 112 indicates that the difference between the on-level voltage and the off-level voltage of the sub-gate signal $G_{sub}$ is greater than the reference voltage $V_{ref}$ and if the gate-on voltage $V_{on}$ should be adjusted, the value of the compensation voltage $V_{cp}$ used to generate the gate-on voltage $V_{on}$ may be decreased by 0.1 V by adjusting the on/off cycle of the switch 115. Accordingly, the value of the gate-on voltage $V_{on}$ may also be decreased. Finally, a sub-gate signal $G_{sub}$ generated according to the decreased value of the gate-on voltage $V_{on}$ may be fed back to the DC converter 110. The above process may be repeated until an ideal sub-gate signal $G_{sub}$ is output.

In the above example, the preset amount by which the compensation voltage $V_{cp}$ is changed is 0.1 V. However, the present inventive concept is not limited thereto, and the preset amount can have a different value. The compensation voltage $V_{cp}$ can also be changed by a different amount in each process of outputting the compensation voltage $V_{cp}$. For example, if the comparison result of the comparison unit 112 indicates that the gate-on/off voltage difference of the sub-gate signal $G_{sub}$ is relatively large, the compensation voltage $V_{cp}$ may also be changed by a relatively large amount. If the comparison result of the comparison unit 112 indicates that the gate-on/off voltage difference of the sub-gate signal $G_{sub}$ is relatively small, the compensation voltage $V_{cp}$ may also be changed by a relatively small amount.

In addition, the switch unit 113 may accumulate a plurality of comparison results received from the comparison unit 112 and change the compensation voltage $V_{cp}$ using the accumulated comparison results. In this way, the speed at which the compensation voltage $V_{cp}$ and the sub-gate signal $G_{sub}$ are changed can be adjusted.

Figure 8:
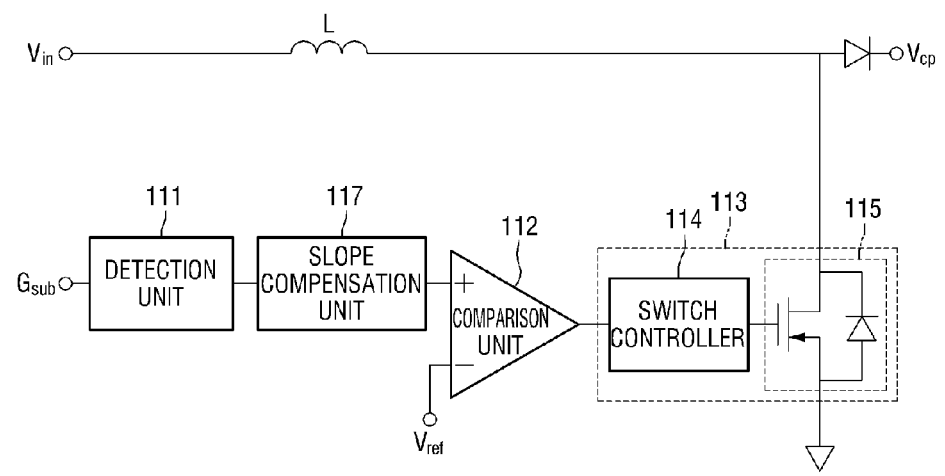
FIG. 8 is a circuit diagram of a DC converter according to another embodiment of the present inventive concept.

FIG. 8 is a circuit diagram of a DC converter 110 according to another embodiment of the present inventive concept.

Referring to FIG. 8, the DC converter 110 receives an input voltage $V_{in}$ and a sub-gate signal $G_{sub}$ and outputs a compensation voltage $V_{cp}$ using the input voltage $V_{in}$ and the sub-gate signal $G_{sub}$. Unlike in the embodiment of FIG. 6, in the current embodiment, a detection result of a detection unit 111 may be input to a comparison unit 112 via a slope compensation unit 117. The slope compensation unit 117 may keep the circuit stable by preventing the circuit from becoming unstable depending on the waveform of a signal output from the detection unit 111. Since each component of the DC converter 110 excluding the slope compensation unit 117 has been described above with reference to FIG. 6, a description thereof will be omitted.

Figure 9:
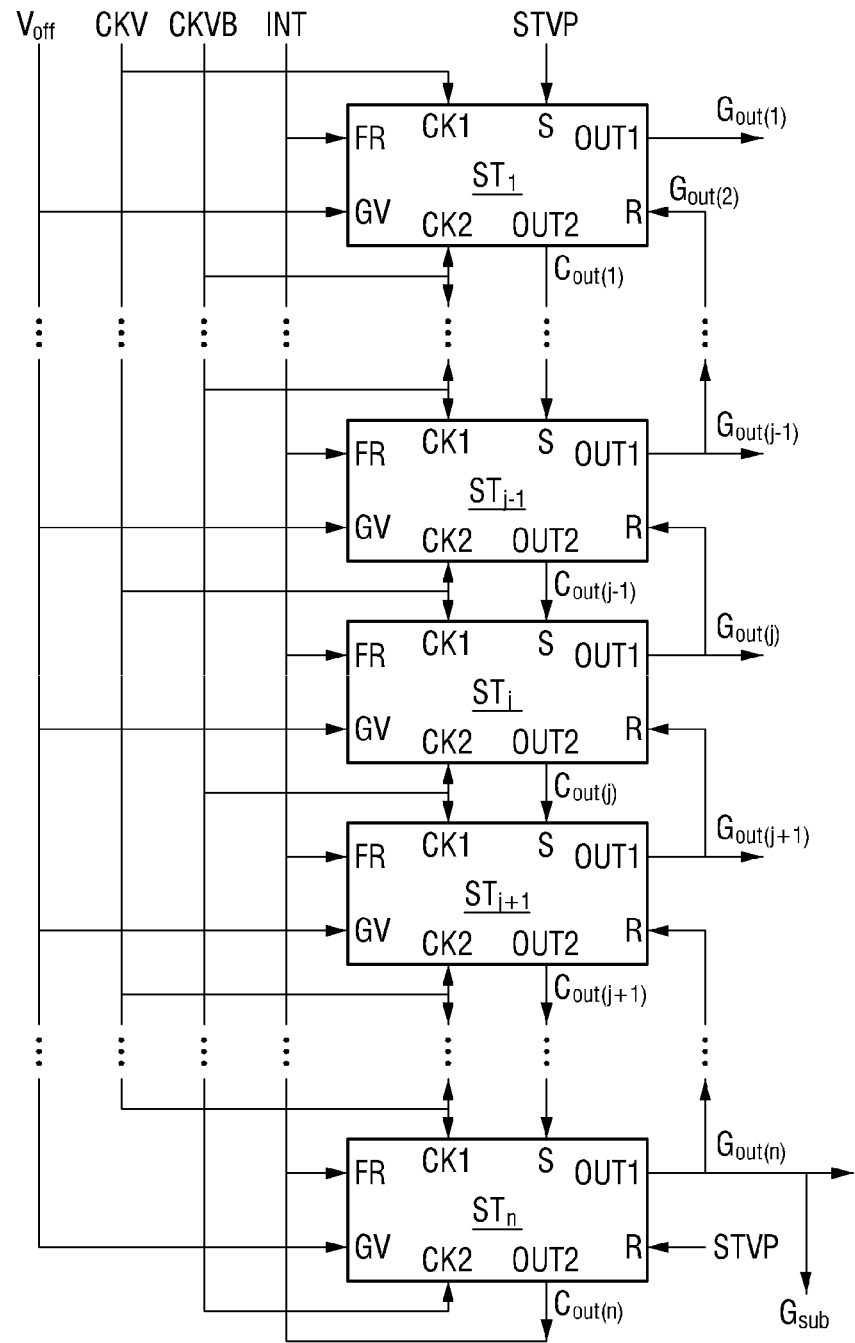
FIG. 9 is a block diagram of a gate driver according to an embodiment of the present inventive concept.

FIG. 9 is a block diagram of a gate driver 300 according to an embodiment of the present inventive concept.

Referring to FIG. 9, the gate driver 300 is enabled by a scan start signal STVP to generate a plurality of gate signals $G_{out(1)}$ through $G_{out(n)}$ using a clock signal CKV, a clock bar signal CKVB and a gate-off voltage $V_{off}$, and sequentially provide the gate signals $G_{out(1)}$ through $G_{out(n)}$ to a plurality of gate lines $G_1$ through $G_n$, respectively.

More specifically, the gate driver 300 includes a plurality of stages $ST_1$ through $ST_n$. The stages $ST_1$ through $ST_n$ are connected in a cascade manner. The stages $ST_1$ through $ST_n$ are connected to the respective gate lines $G_1$ through $G_n$ and output the gate signals $G_{out(1)}$ through $G_{out(n)}$ to the gate lines $G_1$ through $G_n$, respectively. The gate-off voltage $V_{off}$, the clock signal CKV, the clock bar signal CKVB, and an initialization signal INT are input to each of the stages $ST_1$ through $ST_n$. The initialization signal INT may be provided by the clock generator 200.

Each of the stages $ST_1$ through $ST_n$ may have a first clock terminal CK1, a second clock terminal CK2, a set terminal S, a reset terminal R, a power source terminal GV, a frame reset terminal FR, a gate output terminal OUT1, and a carry output terminal OUT2.

For example, a carry signal $C_{out(j-1)}$ of a previous stage $ST_{j-1}$ may be input to the set terminal S of a $j^{th}$ stage $ST_j$ connected to a $j^{th}$ gate line $G_j$ (j≠1), a gate signal $G_{out(j+1)}$ of a next stage $ST_{j+1}$ may be input to the reset terminal R of the $j^{th}$ stage $ST_j$, and the clock signal CKV and the clock bar signal CKVB may respectively be input to the first clock terminal CK1 and the second clock terminal CK2 of the $j^{th}$ stage $ST_j$. In addition, the gate-off voltage $V_{off}$ may be input to the power source terminal GV, the initialization signal INT or a carry signal $C_{out(n)}$ of a last stage $ST_n$ may be input to the frame reset terminal FR. The gate output terminal OUT1 may output a gate signal $G_{out(j)}$, and the carry output terminal OUT2 may output a carry signal $C_{out(j)}$.

The scan start signal STVP, instead of a carry signal of a previous stage, may be input to the set terminal S of a first stage $ST_1$ because there is no carry signal of a previous stage. Also, the scan start signal STVP, instead of a carry signal of a next stage, may be input to the reset terminal R of the last stage $ST_n$ because there is no carry signal of a next stage.

In addition, a gate line in any of the stages $ST_1$ through $ST_n$ may be connected to the gate voltage generator 100 such that one of the gate signals $G_{out(1)}$ through $G_{out(n)}$ can be fed back as a sub-gate signal $G_{sub}$.

In this embodiment, the gate signal $G_{out(n)}$ of the last stage $ST_n$ located at the bottom of the drawing is connected to the gate voltage generator 100 as a sub-gate signal $G_{sub}$. If the gate signal $G_{out(n)}$ of the last stage $ST_n$ is provided to the gate voltage generator 100, the sub-gate signal $G_{sub}$ reflecting all the stages $ST_1$ through $ST_n$ can be provided to the gate voltage generator 100 as the sub-gate signal $G_{sub}$ because the stages $ST_1$ through $ST_n$ are electrically connected to each other to exchange signals.

The gate driver 300 may be manufactured as a separate semiconductor chip and attached to the liquid crystal panel 600, or directly formed on the liquid crystal panel 600 as an amorphous silicon thin-film transistor. When each of the stages $ST_1$ through $ST_n$ is manufactured as an amorphous silicon thin-film transistor, cost and space can be saved than when each of the stages $ST_1$ through $ST_n$ is manufactured as a separate semiconductor chip. However, each of the stages $ST_1$ through $ST_n$ is not necessarily manufactured using the above material or method and can be manufactured using various other methods of manufacturing an electronic element.

Figure 10:
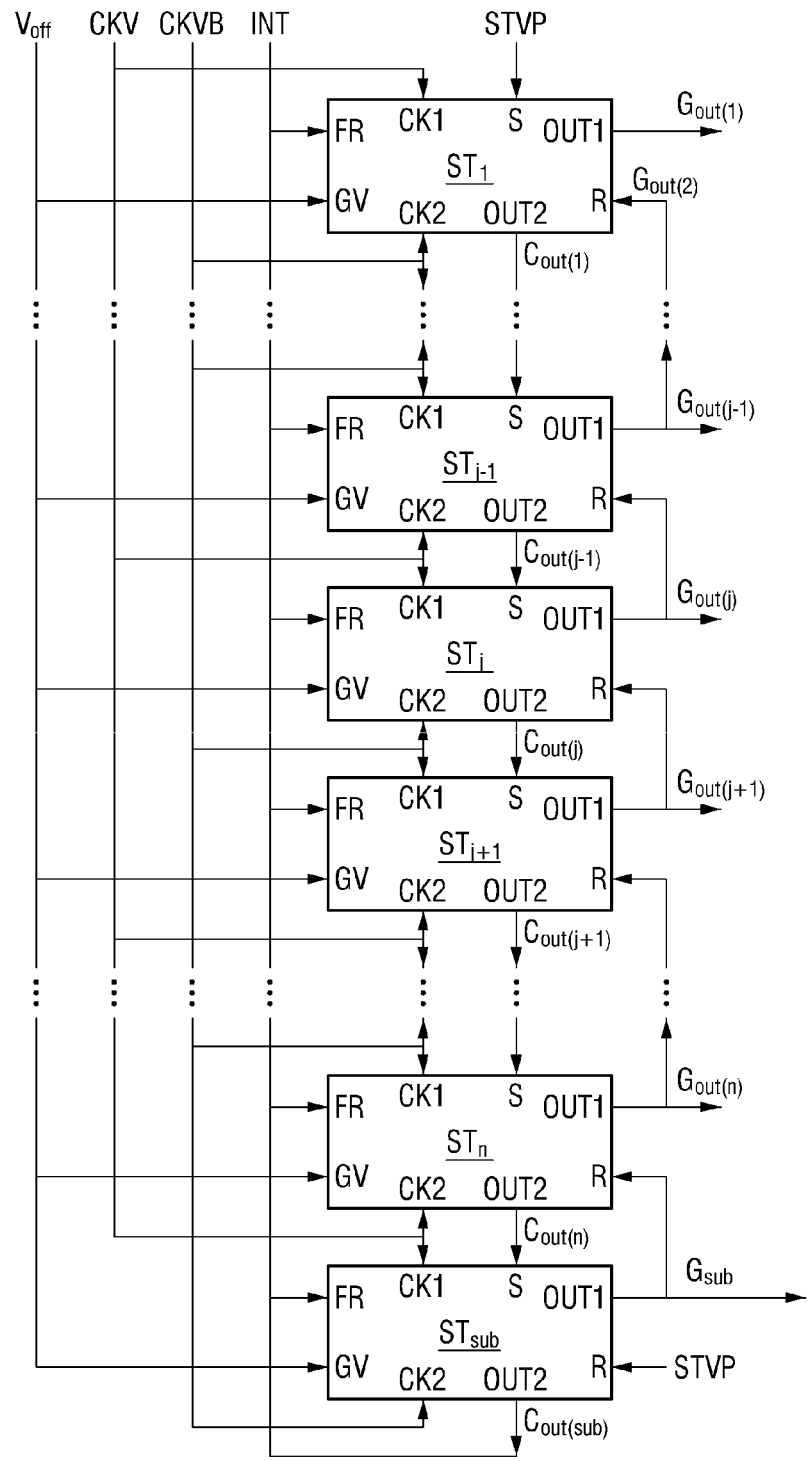
FIG. 10 is a block diagram of a gate driver according to another embodiment of the present inventive concept.
Figure 11:
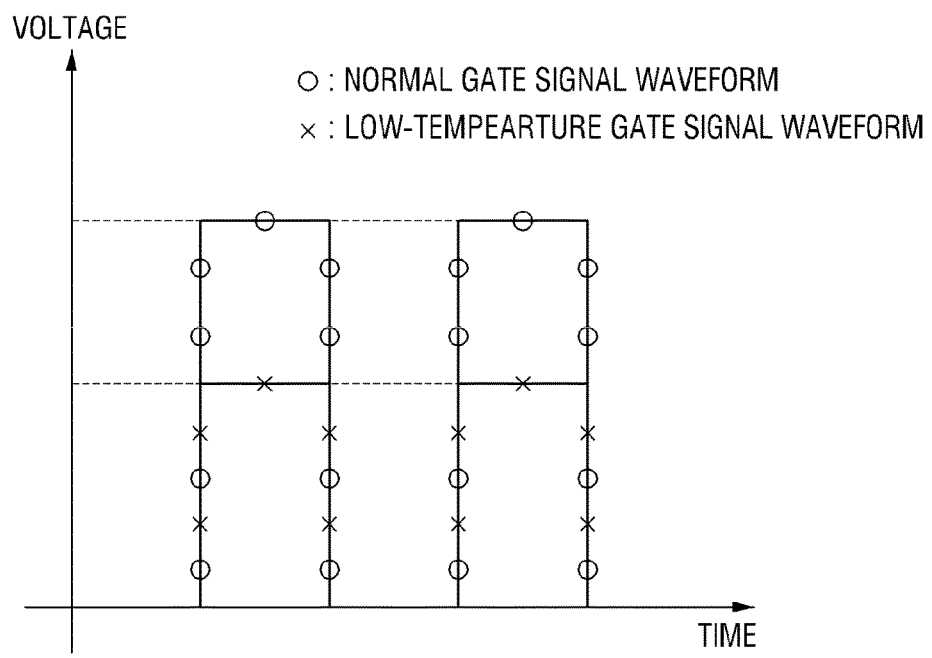
FIG. 11 is a graph illustrating the voltage level of a gate signal with respect to temperature of a conventional display device.
Figure 12:
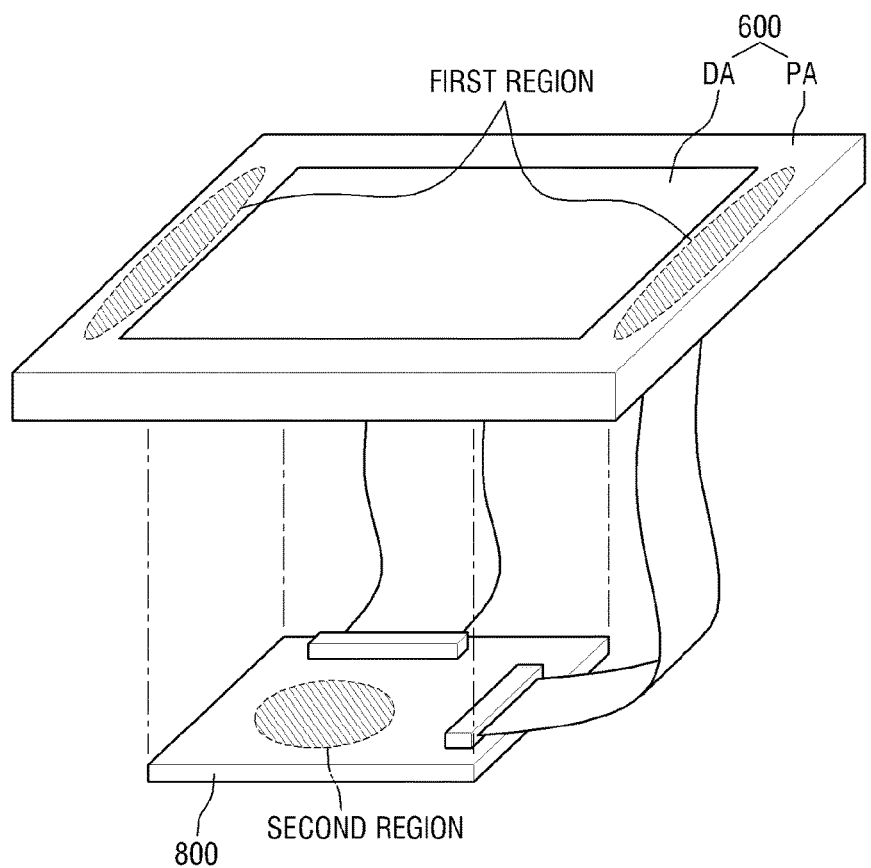
FIG. 12 is a perspective view of a conventional display device.
Figure 13:
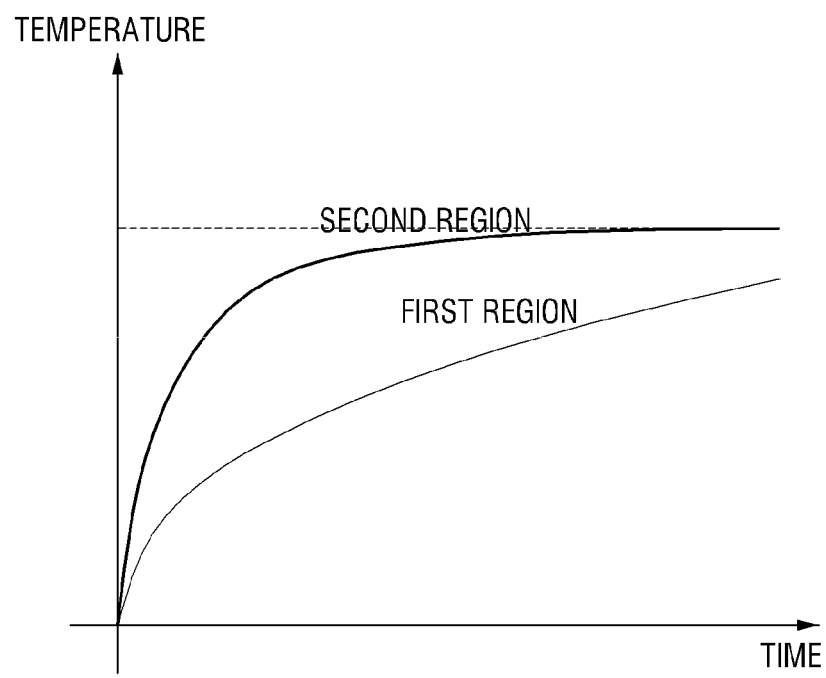
FIG. 13 is a graph illustrating the change in temperature of each region of the display device of FIG. 12.

FIG. 10 is a block diagram of a gate driver 300 according to another embodiment of the present inventive concept.

Referring to FIG. 10, unlike the gate driver 300 of FIG. 9, the gate driver 300 according to the current embodiment may further include a dummy stage $ST_{sub}$ which outputs a sub-gate signal $G_{sub}$ only. The number of dummy stages may be more than one. Since each component of the gate driver 300 excluding the dummy stage has been described above with reference to FIG. 9, a description thereof will be omitted. The dummy stage provides the sub-gate signal Gsub to the reset terminal of the previous stage STn and receives the scan start signal STVP as a reset signal. Embodiments of the present inventive concept provide at least one of the following advantages.

It is possible to output a gate signal having a constant voltage value despite a temperature change of a display device.

However, the effects of the present inventive concept are not restricted to the one set forth herein. The above and other effects of the present inventive concept will become more apparent to one of ordinary skill in the art to which the present inventive concept pertains by referencing the claims.

What is claimed is:

1. A display device comprising:
   a gate voltage generator outputting a gate-on voltage and a gate-off voltage;

a clock generator receiving the gate-on voltage and the gate-off voltage and outputting a clock signal;

a gate driver receiving the clock signal and outputting a gate signal, the gate driver including a plurality of stages which are connected to a plurality of gate lines respectively; and a plurality of pixels which are turned on or turned off by the gate signal to display an image, wherein the gate voltage generator comprises:

a direct current (DC) converter connected to a sub-gate node and receiving a sub-gate signal from the last stage of the plurality of stages and outputting a compensation voltage using the received sub-gate signal.

2. The display device of claim 1, wherein the gate voltage generator further comprising:

a charge pump connected to the DC converter and generating a gate on voltage and a gate off voltage using the compensation voltage.

3. The display device of claim 2, wherein the DC converter comprises:

a detector connected to the sub-gate node and measuring a difference between an on-level voltage and an off-level voltage of the received sub-gate signal;

a comparator connected to the detector and comparing a preset reference voltage with the difference between the on-level voltage and the off-level voltage of the sub-gate signal;

a switch unit connected between the comparator and an output node, the switch unit including a switch and a switch controller which controls the switch using a comparison result of the comparator; and an inductor connected between an input node and the output node.

4. The display device of claim 3, wherein, when the difference between the on-level voltage and the off-level voltage of the sub-gate signal is smaller than the preset reference voltage, the DC converter outputs the compensation voltage that causes an on-level voltage of the sub-gate signal having a greater value than the on-level voltage of a previous sub-gate signal.

5. The display device of claim 4, wherein the a plurality of stages sequentially output the gate signal, each of the stages including at least one amorphous silicon thin-film transistor, and wherein the gate driver further includes a dummy stage which outputs the sub-gate signal that is provided to the gate voltage generator.

6. The display device of claim 5, wherein the sub-gate signal is provided from the last stage.

7. The display device of claim 3, wherein the switch unit accumulates a plurality of comparison results received from the comparator and controls the operation of the switch using the accumulated comparison results.

8. The display device of claim 3, wherein the DC converter further comprises a slope comparator.

9. The display device of claim 3, wherein the DC converter outputs a plurality of compensation voltages.

10. A method of driving a display device, the method comprising:

providing a sub-gate signal received from the last stage of a gate driver, to a DC converter;

generating a compensation voltage using the sub-gate signal;

generating a gate-on voltage and a gate-off voltage using the compensation voltage;

generating a clock signal using the gate-on voltage and the gate-off voltage; and generating a modified gate signal using the clock signal.

11. The method of claim 10, wherein the generating the compensation voltage comprises:

measuring a difference between an on-level voltage and an off-level voltage of the sub-gate signal;

comparing a preset reference voltage with the difference between the on-level voltage and the off-level voltage of the sub-gate signal; and controlling a switch to reduce a difference between the gate-on/off voltage difference and the reference voltage.

* * * * *